United States Patent

[11] 3,604,962

| [72] | Inventors | John C. Larson<br>Woodstock;<br>Jacques J. Desy, Bearsville, both of, N.Y. |
|---|---|---|
| [21] | Appl. No. | 857,128 |
| [22] | Filed | Sept. 11, 1969 |
| [45] | Patented | Sept. 14, 1971 |
| [73] | Assignee | Rotron Incorporated<br>Woodstock, N.Y. |

[54] MOTOR BEARING AND FAN CONSTRUCTION
7 Claims, 4 Drawing Figs.

[52] U.S. Cl. ..................................... 310/67,
310/90, 308/166
[51] Int. Cl. ............................................ H02k 5/16
[50] Field of Search ........................................... 310/67, 90,
68; 230/117; 308/166

[56] References Cited
UNITED STATES PATENTS

| 2,701,845 | 2/1955 | Gallagher et al. | 310/90 |
| 2,847,593 | 8/1958 | Selbach et al. | 310/90 |
| 2,984,757 | 5/1961 | Papworth | 310/90 X |
| 3,229,897 | 1/1966 | Papst | 230/117 |
| 3,452,226 | 6/1969 | Hettich | 310/90 X |
| 3,458,740 | 7/1969 | Kaneko et al. | 310/90 X |
| 2,564,307 | 8/1951 | Keiser | 308/166 |

Primary Examiner—D. F. Duggan
Attorney—Brumbaugh, Graves, Donohue & Raymond

ABSTRACT: An electric motor in accordance with the invention disclosed herein comprises a stator coaxial with and separated from a rotor by a radial or journal bearing arrangement including a pin rotatably received in a sleeve. One end of the pin comprises a thrust face which bears against a thrust bearing to prevent axial movement of the motor. In one embodiment, the thrust face is convex and the thrust bearing is a flat jewel or plastic member. In another embodiment, the thrust face is flat and the thrust bearing is a spherical jewel. In still another embodiment, the thrust face is concave and the thrust bearing is a spherical jewel. For taking up axial play, an adjustably mounted resilient plug member is moved into close proximity with the other end of the pin. Fan blades are mounted on the periphery of the rotor and rotate within a housing coupled to the stator.

INVENTORS.
JOHN C. LARSON &
JACQUES J. DESY
BY
Brumbaugh, Graves, Donohue & Raymond
their ATTORNEYS

MOTOR BEARING AND FAN CONSTRUCTION

Small electric motors present a variety of special problems, particularly in the design of the bearing arrangement, due to their size. For example, since the motor is small, the thrust bearing is relatively close to the radial bearing and wear debris from the former scatters in the direction of the latter. If this wear debris becomes lodged in or on the radial bearing, performance is adversely affected and the motor must be dismantled and cleaned or replaced. Particular problems arise if the radial bearing assembly is of the type that generates its own lubricating film of air or other gas, because the debris may upset the intended load-carrying characteristics and result in possible malfunction or failure. Cleaning or replacement of the bearings is undesirable since it adds to the maintenance cost of the motor.

Thrust bearings may be used at both ends of the motor to restrain movement of the rotor in both axial directions, but this generally adds to the cost of manufacture of the motor because of the close tolerances that must be maintained. In certain applications, usually where the thrust is in one direction, it is usual to shim the other end of the rotor carrying member so as to prevent axial play. Shimming does not, however, significantly reduce the cost since the motors are small and great care in assembly is required.

Although the above problems are generic to all small motors, they are of particular significance in the design of small fans where an air or other gas flow is usually created that aids in scattering wear debris in the direction of the radial bearing and where the thrust is in one direction. Fans of this type find use in exhausting hot air or other gas from electronic apparatus and in spot cooling in aircraft installations. In this application additional problems are presented, i.e., not only must the fan be economical, but also, compact and relatively light weight.

It is an object of this invention, therefore, to provide a thrust bearing arrangement for small motors that will not scatter debris in the area of the radial bearing, thus avoiding the problem associated with the debris.

It is another object of this invention to eliminate the close tolerances and careful assembly generally required in the manufacture of small motors by providing an adjustable retaining member for one end of the rotor, thus reducing the cost of such motors.

It is still another object of this invention to provide a compact, lightweight fan having a thrust bearing arrangement that will not scatter wear debris and has an adjustable retaining member for the rotor.

Briefly described, a motor according to this invention comprises a rotor and a stator spaced therefrom by a radial bearing assembly interposed therebetween. The radial bearing assembly includes a sleeve rotatably receiving a pin. One end face of the pin provides a thrust face that cooperates with a thrust bearing member to accommodate axial forces.

In one embodiment disclosed herein, the thrust face is slightly convex and the thrust bearing is a flat sapphire member. In a similar embodiment, the thrust bearing is a flat plastic member.

In another embodiment, the thrust face is flat and the thrust bearing is a sapphire ball. In yet another embodiment, the thrust face is slightly concave and forms a seat for a sapphire ball.

The other end of the motor may comprise a thrust bearing arrangement as described above, but where thrust forces are essentially unidirectional, a preferable arrangement comprises a threadably adjustable plug having a resilient surface that cooperates with the other end face of the pin.

For a better understanding of the present invention, reference is made to the following specification and the accompanying drawings, in which.

Figure 1:
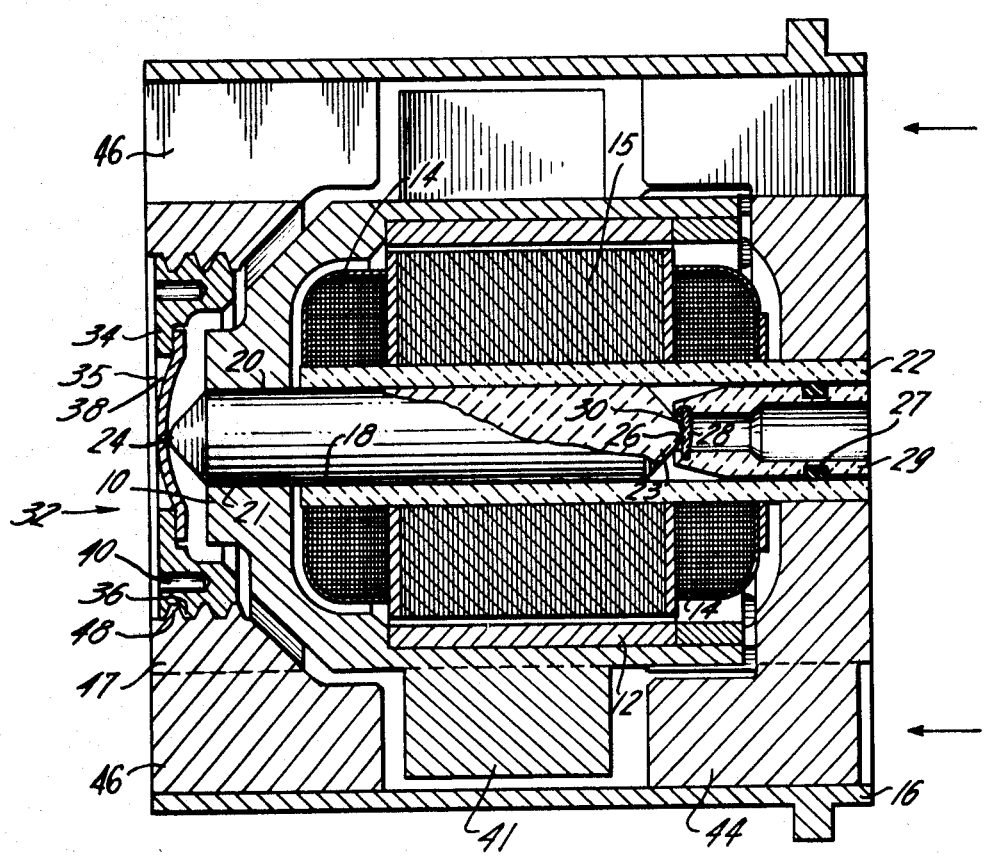
FIG. 1 is a cross-sectional view of a fan in accordance with the invention described herein.

Referring to FIG. 1 of the drawings, there is disclosed a three-piece motor arrangement comprising a rotor assembly 10 including a hysteresis liner or a stack of laminations 12, a stator assembly 14 including laminations 15, and a housing 16. The rotor assembly 10 surrounds the stator assembly 14 so that the laminations 15 are radially spaced from the laminations 12 to provide an electric motor. Since, of course, the rotor assembly rotates relative to the stator, a suitable radial bearing assembly 18 is provided.

The radial bearing assembly 18 comprises a male pin or shaft 20 and a sleeve member 22 fixedly supporting the stator assembly 14 and rotatably receiving the pin. The sleeve member 22, is carried by the housing 16, as will be more fully described hereinafter. One end 21 of the pin 20 projects beyond one end of the sleeve 22 and is fixedly secured to the rotor assembly 10 and provides a journal therefor. Located inside and spaced from the other end of the sleeve 22 is the other end 23 of the pin 20. Preferably, the pin and sleeve are made of a ceramic material such as disclosed in U.S. Pat. No. 3,284,144. Bearings of this type are commonly known as pneumodynamic bearings because upon relative rotation, a lubricating film of air or other gas is generated. It is to be understood, of course, that other suitable material can be used.

Both ends 21 and 23 of the pin 20 include conical portions having end faces 24 and 26, respectively. In the embodiment disclosed in FIGS. 1 and 2, end face 26 is convex and provides a spherical thrust face that cooperates with a thrust bearing 28 to prevent axial movement of the rotor assembly 10. A sleeve 29 is suitably located in the sleeve 22, and carries the thrust bearing 28. A resilient O-ring 27 may be provided in an annular groove formed in sleeve 29 to form a fluidtight seal between sleeves 22 and 29. In this embodiment, the thrust bearing 28 comprises a disclike member having a flat surface 30 that cooperates with the convex thrust face 26 to establish a low area contact therebetween.

The thrust bearing 28 may comprise a jewel member, such as sapphire, or alternatively, may comprise a tough plastic or synthetic resin which gradually cold flows into a slight indentation complementary to the thrust face 26. By using plastic, the cost of manufacture is reduced, but because of the indentation that is formed, the useful life of the thrust bearing is must shorter than the sapphire. Also, the use of a plastic thrust bearing arrangement provides a centering device when subjected to axial loading.

Figure 3:
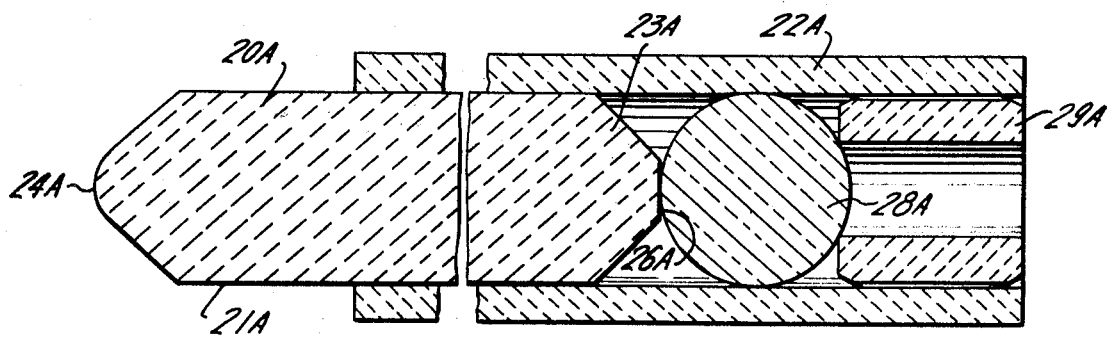
FIG. 3 is a cross-sectional view of another bearing arrangement that can be utilized in the fan disclosed in FIG. 1.

Another form of a thrust bearing arrangement according to the invention is disclosed in FIG. 3, wherein like reference numerals with the suffix "a" are utilized in referring to like parts. The pin 20 is provided with a flattened end face 26a which functions as a thrust face and cooperates with a spherical ball 28a to restrain the motor against axial movement. Except for a seat for receiving the spherical ball, sleeve 29a is similar to the sleeve 29. Again, a low area contact between the thrust bearing and thrust face is achieved. Although the ball may be made of any suitable substance, sapphire is preferred.

Figure 4:
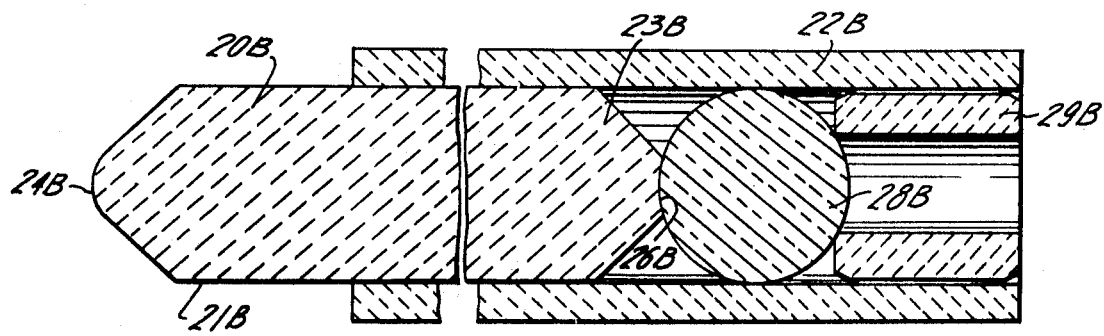
FIG. 4 is a cross-sectional view of still another bearing arrangement that can be utilized in the fan disclosed in FIG. 1.

Referring to FIG. 4, still another form of a thrust bearing arrangement according to the invention is disclosed wherein the suffix "b" is provided for like reference numerals. The pin 20 is provided with a concave face 26b that receives a spherical thrust ball 28b to restrain the rotor against axial movement. Again, the spherical ball 28b is preferably sapphire and seats in a sleeve 29b having a surface adapted to receive its contour. The concave face 26b closely matches, but is slightly greater than, the radius of the thrust bearing 28b.

Figure 2:
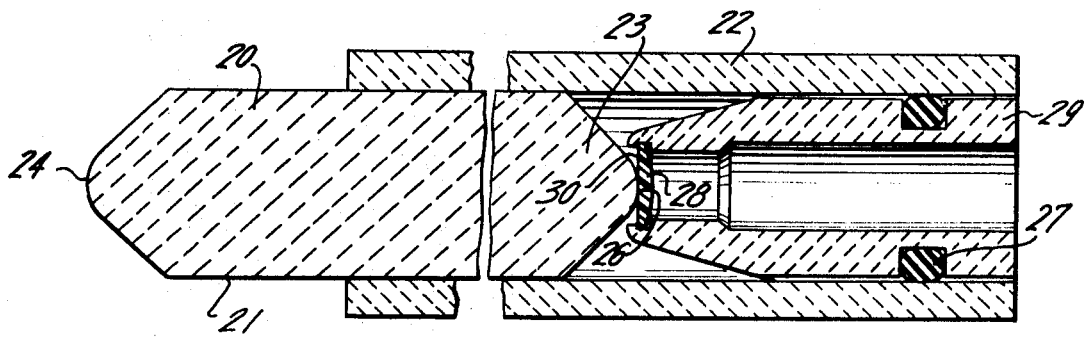
FIG. 2 is a cross-sectional view of one type of bearing arrangement utilized in the fan disclosed in FIG. 1.

It will be understood that an O-ring 27 as shown in FIGS. 1 and 2 also may be provided in the embodiments of FIGS. 3 and 4.

Use of the thrust bearings described above prevents debris from scattering in the direction of the radial bearing and results in an improved operation. Although the exact theory underlying the improved operation is not completely understood, several explanations have been advanced. First, there is no through cavity in the thrust face region so that no air is admitted to scatter the debris. Second, due to the conical end portion of the pin 20, a relatively large distance is provided between the thrust bearing and the operative portion of the radial bearing. Third, a low level of electrical change self-generated by the radial and thrust surfaces, appears to collect the debris in a concentric cluster on the thrust bearing. It is to be understood that theoretical explanations are not by way of limitation, but are merely possible reasons that explain the operating characteristics of the bearings.

Similar thrust bearings or a shim arrangement may be provided at the other end of the pin 20 to take up axial play in the opposite direction; however, to eliminate the need for observing close tolerances in assembly of the motor, an adjustable retaining assembly 32 preferably is provided. The retaining assembly comprises cup-shaped plug 34 having an aperture 35 extending through the base portion and a suitable thread 36 provided on the outer surface of the flange portion. Adhesively secured to the base portion of the plug 34 and extending across the opening 35 is a concave resilient member 38 which may be made of plastic or other suitable material. The purpose of the resilient member 38 will be explained hereinafter. A plurality of openings 40 are provided around the periphery of the plug 34 and are adapted to cooperate with a wrenching tool for a function to be fully explained hereinafter.

In use, the plug 32 is mounted in the housing 16 of the motor by the threads 36 so that the resilient member 38 adjustably lies in close proximity to the end face 24 of the pin 20. Openings 40 receive a spanning wrench so that the plug 32 may be adjusted. If desired, a thrust element such as disc 28 (FIGS 1 and 2) may be carried centrally of the resilient member 38 to minimize friction losses.

Referring to FIG. 1, an impeller 41 is mounted on or integrally part of, the rotor assembly 10 rotatably mounted above the stator assembly 14 by the bearings assembly 18 to provide a fan. The fan is mounted in the housing 16, the inlet end of which is provided with a plurality of vanes 44 to provide an initial twisting to the air or other gas drawn in by the impeller 41. At the outlet end of the housing 42, another plurality of vanes 46 is provided to straighten the air or other gas exhausted by the impeller 41. The vanes 46 are integrally formed on a central hub 47 having a bore with threads 48 to cooperate with and adjustably receive the threads 36 on the retaining plug 34. The vane and hub assembly 46, 47, may be force fitted or otherwise firmly secured to the inner wall of the housing 16. Accordingly, an improved, narrow fan suitable for use in electronic installations and aircraft is provided.

While in the foregoing there has been disclosed an illustrative embodiment of this invention, various modifications will occur to those skilled in the art to which this invention pertains. Accordingly, it is not desired to limit the invention to the exact features disclosed, but to encompass all such modifications.

I claim:

1. An electric motor comprising stator means and rotor means radially spaced therefrom and coaxial therewith, radial bearing means for rotatably supporting the rotor means with respect to the stator means, the radial bearing means including a sleeve fixedly carrying the stator means and a pin rotatably carried in the sleeve and fixedly carried by the rotor means, one end of the pin projecting beyond one end of the sleeve and the other end of the pin terminating within and adjacent the other end of the sleeve, a thrust face formed on said other end of the pin, a thrust bearing seat member inserted into and affixed in the interior of the sleeve, at said other end of the sleeve and a thrust bearing held by the seat member for engagement with the thrust face, and an axially adjustable retaining means adjacent said one end of said pin for limiting axial movement of the rotor assembly.

2. An electric motor according to claim 1 wherein the thrust bearing is a disc shaped member, has a substantially flat surface which contacts the thrust face, and is supported about the periphery thereof by an annular end portion of the seat member.

3. An electric motor according to claim 1 wherein the thrust bearing comprises a ball positioned intermediate said other pin end and the seat member.

4. An electric fan in which, during operation, axial thrust of the rotor is in one direction, the fan comprising a housing having stator means and rotor means mounted therein, the rotor means carrying an impeller about its periphery, a radial bearing assembly interposed between the stator means and the rotor means to allow for rotation of the rotor means, the radial bearing assembly comprising a sleeve fixedly carrying the stator means and rotatably receiving a pin fixedly carried by the rotor means, the pin having a thrust face on one end thereof, a thrust bearing contacting the thrust face to prevent movement of the rotor means in the direction of axial thrust, and retaining means for limiting axial movement of the rotor means in the opposite direction, the retaining means comprising an annular member axially adjustably positioned and supported in a bored hub at the other end of the housing and a resilient member extending across the aperture in the annular member in close proximity to the other end of the pin to stop pin and rotor movement in said opposite direction.

5. An electric motor comprising stator means and rotor means radially spaced therefrom and coaxial therewith, radial bearing means for rotatably supporting the rotor means with respect to the stator means, the radial bearing means including a sleeve fixedly carried by the stator means, and a pin rotatably carried in the sleeve and fixedly carried by the rotor means, one end of the pin terminating within and adjacent one end of the sleeve, a thrust face formed on said end of the pin, an annular bearing support member inserted in and affixed to the interior of the sleeve, and a thrust bearing engaged by and held against axial movement at said end of the sleeve, by the annular bearing support member for engagement with the thrust face.

6. Apparatus comprising a housing having motor means therein, the housing including a hub having a threaded central bore, and a plurality of vanes extending radially from said hub, a portion of said motor means projecting adjacent to one end of the housing, retaining means for limiting axial movement of the motor means portion, the retaining means comprising a cup-shaped plug adjustably carried within said bore at said one end of the housing with a threaded peripheral surface engaging the threaded bore of said hub, an aperture through the base portion of the plug, and a resilient member extending across the aperture in close proximity to the projecting portion of the motor means.

7. Apparatus comprising a housing having motor means therein, the motor means comprising a rotor means rotatably supported with respect to a stator means by a radial bearing assembly, a portion of said motor means projecting adjacent to one end of the housing and comprising a pin, the radial bearing assembly including a sleeve fixedly carrying the stator means and receiving therein the pin, retaining means for limiting axial movement of the motor means projecting portion, the retaining means comprising a cup-shaped plug adjustably carried within a bore at said end of the housing, an aperture through the base portion of the plug, and a resilient member extending across the aperture in close proximity to the projecting portion of the motor means.